May 9, 1967  J. A. HOUCK  3,318,606
AGITATOR SHAFT SEAL FOR MIXERS
Filed Aug. 24, 1964  2 Sheets-Sheet 1
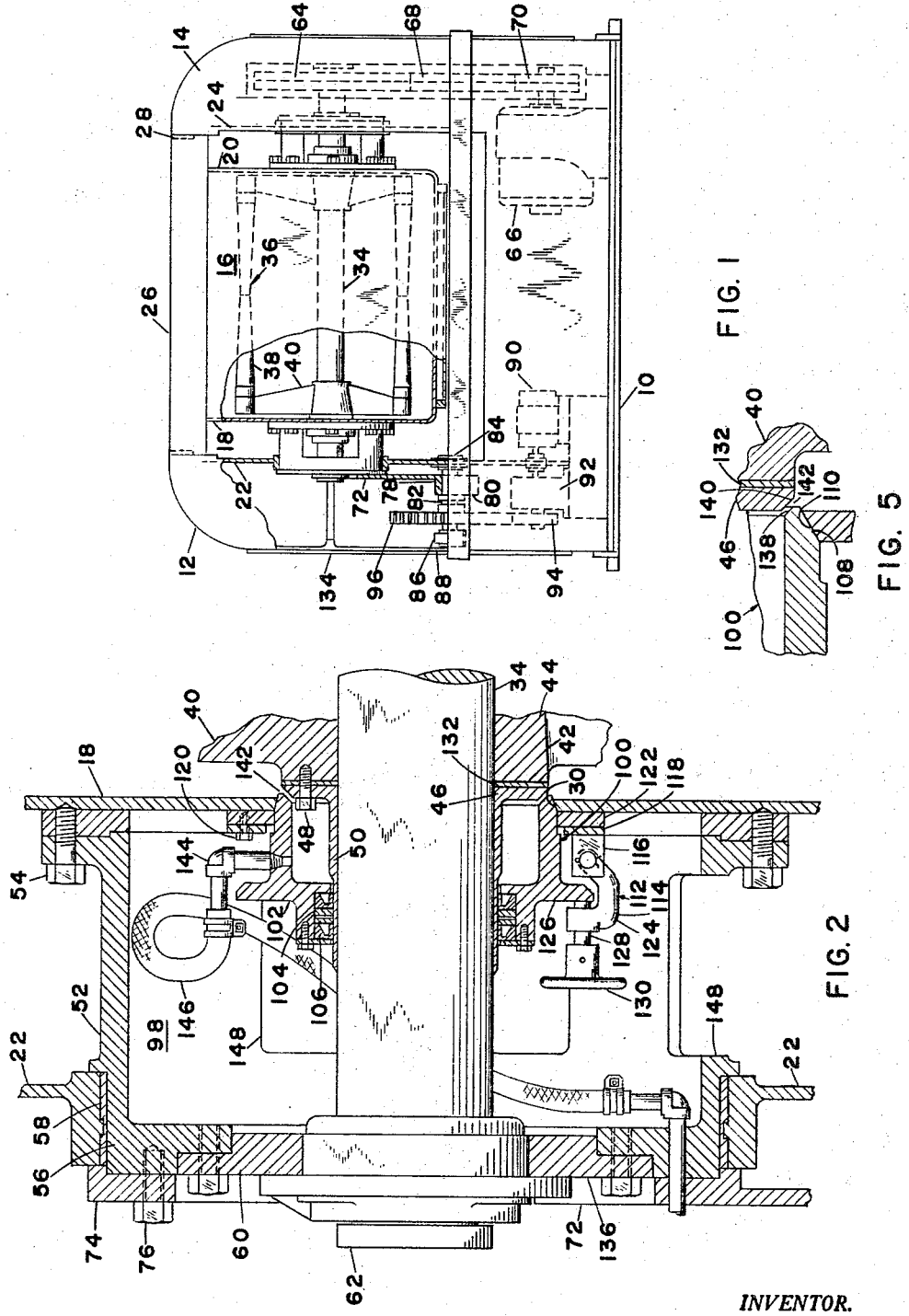
INVENTOR.
JAMES A. HOUCK
BY
*Otto Moeller*
Attorney May 9, 1967  J. A. HOUCK  3,318,606
AGITATOR SHAFT SEAL FOR MIXERS
Filed Aug. 24, 1964  2 Sheets-Sheet 2

INVENTOR.
JAMES A. HOUCK
BY
Otto Moeller
Attorney

United States Patent Office 3,318,606
Patented May 9, 1967

3,318,606
AGITATOR SHAFT SEAL FOR MIXERS
James A. Houck, York, Pa., assignor to Read Corporation, York, Pa., a corporation of Delaware
Filed Aug. 24, 1964, Ser. No. 391,621
3 Claims. (Cl. 277—72)

This invention relates to horizontal dough mixers or the like and more particularly to an improved pressurized air sealing means adjacent the hub ends of the rotating agitators where the shaft therefor extends freely through the end walls of the mixing bowl.

In mixers of this type the hubs of the agitators are disposed in close proximity to the bowl end walls, sufficient space necessarily being provided to permit the agitator to be inserted in and removed from the mixer bowl and to permit the agitator to freely rotate in the mixer bowl. It is important, and in fact required by the sanitary codes of many States, that access to the ends of the hubs be provided for inspection and cleaning, and in view of the space condition adverted to above, it is not possible to accomplish this from within the mixer bowl. An object of this invention is to provide an improved pressurized air seal means adapted to be conveniently applied to the outer side of the mixer bowl end wall in surrounding relation with respect to the agitator shaft, that is conveniently accessible from outside the mixer bowl for securing it to and detaching it from the mixer bowl end wall in an expeditious manner, and that is slidable outwardly along the agitator shaft away from the bowl end wall to expose an opening therein through which access may be had for inspection and cleaning of the agitator hub and the portion of the shaft encompassed by the air seal means when in its sealing position.

Another object is to provide improved sealing means of the type described above wherein the interior of the pressurized air casing when moved from sealing position is readily accessible for cleaning.

As above set forth, in mixers of the type described, the outer end faces of the agitator hubs are disposed in close proximity to the plane of the inner face of the mixer bowl end walls; or in such prior art constructions employing a stationary but removable annular gland plate in close but spaced confronting relation with the outer face of the agitator hub; or in such prior art constructions employing a removable pressurized air seal casing, the inner end wall of which is in spaced confronting relation with the outer face of the agitator hub; in all of which an objectionable annular crevice of considerable radial extent is formed which is open to the interior of the mixer bowl and in which materials can collect. It is an important object of the present invention to eliminate this objectionable crevice and to isolate the agitator hub outer end face from direct contact with the contents of the mixer bowl. This is accomplished by a novel construction and relation of elements whereby the stationary but removable pressurized air seal casing forms an air seal clearance with the outer peripheral edge of the rotatable agitator hub.

A further object is to provide a pressurized air seal as set forth above constructed and arranged for adjusting the extent of the air sealing clearance in a practical, simple and expeditious manner.

With the above and other objects and advantages in view, the present invention consists in the construction, combination and relation of elements hereinafter more fully described, reference being had to the accompanying drawings, in which:

FIGURE 1 is a view in elevation, with parts broken away and shown in section, of a dough mixing machine embodying the present invention;

FIGURE 2 is an enlarged sectional view of a portion of the dough mixing machine of FIGURE 1, showing the movable air sealing means in sealing position;

FIGURE 5 is an enlarged fragmentary sectional view of adjacent parts of the agitator hub and air seal casing showing the air sealing clearance therebetween.

Figure 3:
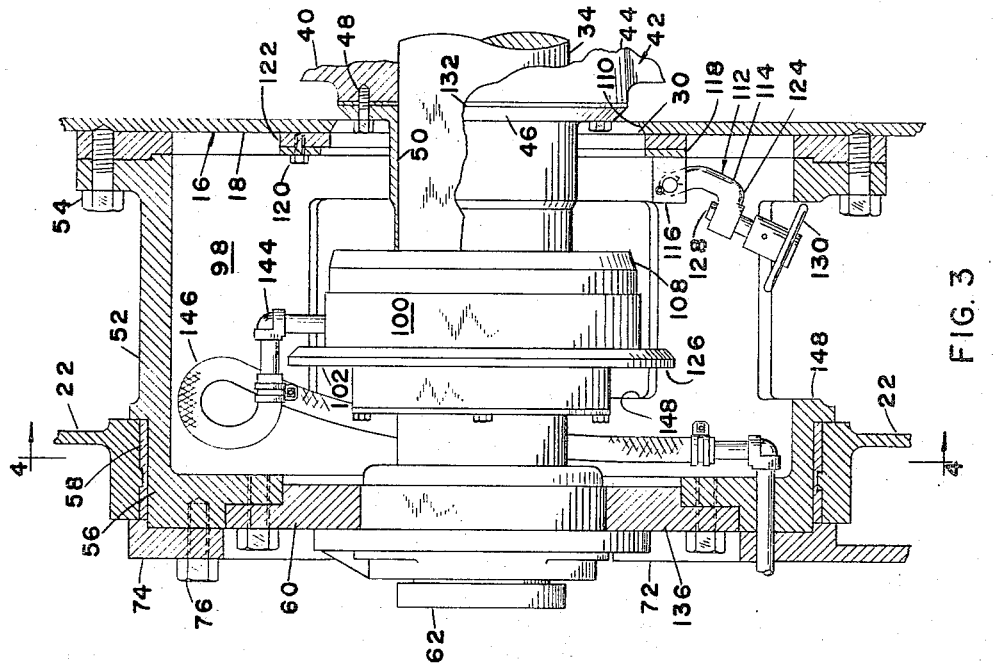
FIGURE 3 is an enlarged sectional view of a portion of the dough mixing machine of FIGURE 1, with the air sealing means shown in elevation and moved along the agitator shaft out of sealing position.
Figure 4:
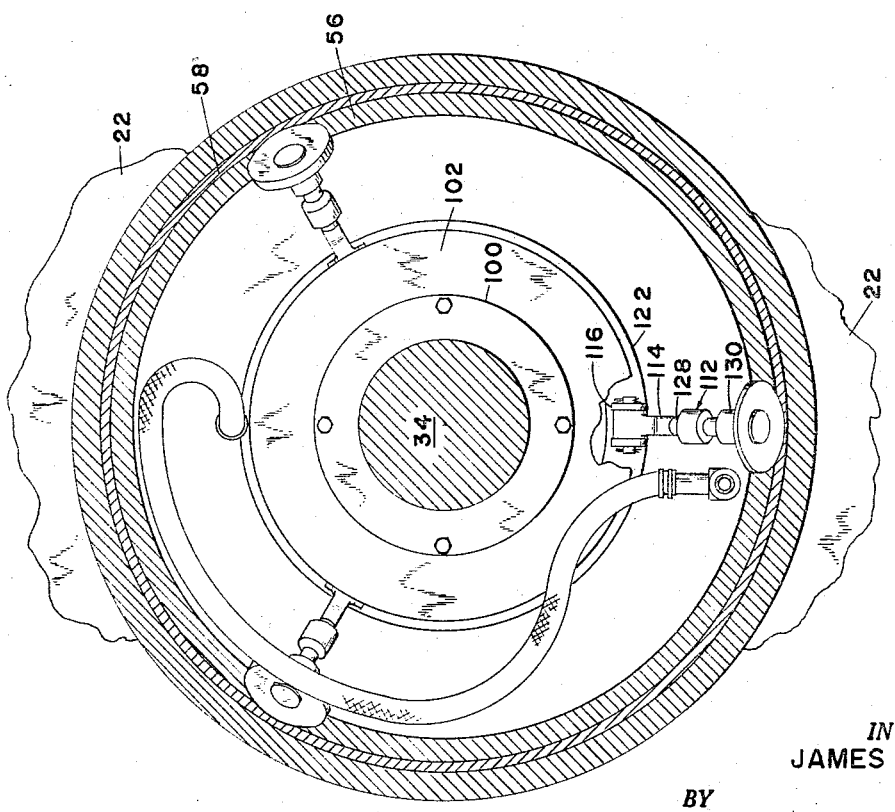
FIGURE 4 is a sectional view taken on line 4—4 of FIGURE 3.

Referring to the drawings, and particularly to FIGURE 1, the horizontal dough mixer comprises a casing having a hollow substantially rectangular base 10 and spaced hollow upright standards 12 and 14 rising from opposite ends of the base 10. Between the standards 12 and 14, above the base 10, is a mixing bowl 16 of well known U-shaped cross sectional construction, mounted to be tilted from its upright mixing position, as shown in FIGURE 1, through preferably about 90° to a position permitting discharge of the dough.

For a reason which will become apparent, the end walls 18 and 20 of the bowl 16 are disposed in inward spaced relation with respect to the inner walls 22 and 24 of the standards 12 and 14. An arcuately formed plate 26, secured by brackets 28 or other suitable means to the upper ends of the standards 12 and 14, is arranged to form a cover over the open upper end of the mixing bowl 16 when the latter is in its normal upright mixing position.

Disposed longitudinally within the mixing bowl 16 and projecting through oversized axially alined circular openings 30 in the bowl end walls 18 and 20 is a rotatable shaft 34, mounted in a manner which will be hereinafter described. Mounted on the shaft 34 and disposed within the bowl 16 is an agitator 36 of any suitable well known type. For purpose of illustration, the agitator 36 is shown as comprising a plurality of kneading or mixing bars 38 spaced from and extending parallel with the agitator shaft 34. The mixing bars 38 are supported at their respective ends on the outer ends of arms 40 radiating from the agitator hubs 42, which are keyed or otherwise suitably secured to the shaft 34 for rotation therewith.

For reasons which will be explained during the course of this description, the hubs 42 preferably include a main hub portion 44 with which the agitator arms 40 are formed and an auxiliary hub portion 46 which is rigidly secured to the outer end face of the main hub portion 44 by cap screws 48. The auxiliary hub portion 46 is preferably provided with an outwardly extending sleeve 50 fitting closely about the shaft 34. This construction is best shown in FIGURE 2 with reference to the left hand end of the mixer, as viewed in FIGURE 1, and it should be understood that a similar construction is provided at the right hand end of the mixer.

The rotatable mounting of the mixing bowl 16 will now be described with reference to the left hand end thereof, as viewed in FIGURE 1, it being understood that the right hand end is mounted in similar manner. Referring particularly to FIGURES 2 and 3, an axially horizontal cylindrical housing 52 is mounted to the bowl end wall 18 in spaced concentric surrounding relation with respect to the opening 30 in any suitable manner, as by a plurality of circumferentially disposed cap screws 54. The laterally outer peripheral end portion of the housing 52 is arranged to form a trunnion 56 for the bowl 16 and is journaled in a bearing 58 mounted in an opening in the inner end wall 22 of the standard 12.

The trunnion end of the housing 52 is provided with an outer end wall 60 in which is mounted an anti-friction bearing 62 arranged, in cooperation with the similar bearing 56 at the right hand end of the mixer, to rotatably support the agitator shaft 34 so that it extends centrally through the openings 30 in the mixer bowl end walls 18 and 20. At the right hand end of the mixer, the agitator shaft 34 is extended into the standard 14 beyond the bearing 62 for application thereto of drive means for rotating the agitator shaft 34. The drive means includes a large sprocket 64 disposed in the standard 14 fixed on the said extension of the shaft 34, a motor 66 mounted in the base 10 and a chain 68 trained around large sprocket 64 and a small sprocket 70 fixed on the output shaft of the motor 66.

The operating means for rotating the bowl 16 is preferably applied to one end thereof and will now be described with reference to the left hand end of the mixer, as viewed in FIGURE 1. It includes a generally quadrant shaped flange 72 subtending an annulus 74 secured to the radially outer portion of the end wall 60 of the housing 52 in any suitable manner, as by cap screws 76. The quadrant shaped flange 72 projects radially outward of the trunnion end of the housing 46 and has secured to its arcuate peripheral edge a rack 78 which is concentric with the tilting axis of the mixing bowl 16 on its trunnions 56. Meshing with the rack 78 is a pinion 80 fixed on a horizontal shaft 82 disposed in the lower rearward portion of the standard 12 and journaled at its ends in suitable bearings 84 and 86, respectively supported by respective inner and outer walls 22 and 88 of the standard 12. The shaft 82 is rotated by a motor 90 through a speed reducer 92, and a pinion 94 fixed on the output shaft of the speed reducer 92 meshing with a gear 96 fixed on the shaft 82.

To prevent leakage out along the agitator shaft 34 where it projects through the end walls of the mixer bowl 16, or along the shaft sleeve 50 when employed, a novel air sealing means designated as a whole by the reference character 98, is provided, the construction of which gives rise to important advantages over prior air seal constructions, as will become apparent from the following description.

The air sealing means 98 will be described with reference to the left hand end of the mixer, as viewed in FIGURE 1, it being understood that the air sealing means 98 at the right hand end of the mixer is similarly constructed. It includes a stationary but detachable cylindrical air seal casing 100 disposed within the housing 52 in spaced surrounding relation with respect to the agitator shaft 34 and concentric with the axis thereof. The outer end of the air seal casing 100 is provided with a rear wall 102 surrounding and having a running clearance with the agitator shaft 34, or with the shaft sleeve 50 where, as shown, a shaft sleeve 50 is provided. The rear wall 102 is provided with an annular seat 104 arranged to accommodate any suitable type of packing 106 to effect a seal for the clearance between the rotating shaft 34 together with its sleeve 50 and the stationary seal casing rear wall 102.

The annular inner end face of the cylindrical seal casing 100 is formed with a circumferential outer tapered portion 108, as best shown in FIGURES 3 and 5, arranged to abut a complementary tapered seat 110 formed in the edge face of the bowl end wall 18 defining the oversized opening 30 therein, whereby the detachable seal casing 100 is self centering for properly orienting it with respect to the agitator shaft 34. Three clamping means 112, equidistantly spaced about the seal casing 100, are provided for drawing the seal casing 100 up tight to effect sealing engagement between the tapered portion 108 and the tapered seat 110.

Each of the clamping means 112 includes a clamp bracket 114 pivotally mounted between ears 116 of a clamp ring 118. Clamp ring 118 is secured, as by cap screws 120 to an annular pad 122 which in turn is secured, as by welding, to the mixer end wall 18 in closely surrounding relation with respect to the oversized opening 30 therein and with just sufficient clearance with respect to the inner end of the seal casing 100 to permit free axial entry and removal of the said inner end of the seal casing 100. The inturned free ends 124 of the pivotally mounted clamp brackets 114 are arranged in one position thereof to overlie a peripheral flange extension 126 of the seal casing rear wall 102, when the seal casing 100 is in sealing position. Threaded through the inturned free ends 124 of the brackets 114 are studs 128, the inner ends of which are arranged to engage the flange extension 126. The outer ends of studs 128 have secured thereto a knob 130, so that upon turning the knob in one direction the inner ends of the studs 128 are forced more tightly into engagement with the flange extension 126 to retain the seal casing 100 in its sealing position and to urge the tapered portion 108 of its inner edge face in tight sealing engagement with the tapered seat 110 defining the oversize opening 30 in mixing bowl end wall 18.

In order to permit convenient insertion of the agitator 36 in the mixing bowl 16 or removal therefrom, the outer end faces of the main hub portions 44 of the hubs 42 are spaced a substantial distance from the plane of the inner faces of the bowl end walls 18 and 20. Since this distance may vary and in any case is such as to make it, if not impossible, at least impractical to provide a uniform and effectively small air seal clearance between the peripherally outer edges of the main hub portions 44 and the inner edge face of the air seal casing 100. In the present construction the detachable auxiliary hub portion 46 is insertable through the oversize opening 30 in the bowl end wall 18 and can conveniently be formed of the desired thickness to provide the desired air seal clearance. In order to insure the most effective air seal clearance and to permit adjustment of the extent thereof, shim means 132 of desired thickness may be inserted and tightly secured between the auxiliary and main hub portions 46 and 44 of the hub 42.

In assembling the mixer, the agitator 36 is inserted into the bowl 16, after which the agitator shaft 34 is axially insertable through an opening 134 in the outer end wall of the standard 12, it being understood that it can also be inserted in similar manner through standard 14. A removable cover 136 in housing end wall 60 permits the seal casing 100, auxiliary hub portion 46 and shim means 132 to be slid along the shaft 34 into the housing 52.

The annular inner end face of the cylindrical seal casing 100 is formed with a circumferentially inner tapered portion 138, as best shown in FIGURE 5, arranged in confronting spaced relation with respect to a complementary tapered portion 140 formed at the axially outer peripheral edge of the auxiliary hub portion 46, to provide therebetween the air seal clearance 142. The auxiliary hub portion 46 thus provides an inner end closure for the air seal casing 100 except for the air seal clearance 142 at the outer peripheral edge of the agitator hub 42, whereby the air seal clearance 142 isolates the outer end face of the hub 42 from direct contact with the contents of the mixer bowl 16.

Air under pressure from any suitable source is introduced into the air seal casing 100 by piping including a pipe fitting 144 and a flexible hose 146. By introducing air into the air seal casing 100 at a pressure greater than that within the mixing bowl 16, leakage of the contents of the bowl through the clearance 142 is rendered negligible. Thus with the air seal clearance at the peripherally outer edge of the agitator hub 42, isolating the outer end face of the hub 42 from direct contact with the contents of the mixer bowl, collection and hardening of materials thereon is rendered negligible, providing greater sanitation than in prior constructions. Such small amounts of materials that may penetrate the air seal clearance and collect in the air seal casing 100 are isolated from direct contact with the materials being mixed in the bowl 16 by the air seal clearance 142.

At such infrequent times that inspection or cleaning of the end face of the hub 42 or the agitator shaft adjacent thereto is desirable, the air seal casing 100 is readily disconnectible and slidable laterally outward along the agitator shaft 34 to a position adjacent the end wall 60 of the housing 52, it being shown in partially retracted position in FIGURE 3. Access to the clamping means 112 for disconnecting the air seal casing 100 may be conveniently had through a plurality of circumferentially spaced openings 148 in the wall of the housing 52 between the spaced walls 18 and 22 of the mixing bowl 16 and standard 12. In the retracted position of the air seal casing 100 access is had through the openings 148 of the housing 52 for inspection and cleaning of the outer end face of the agitator hub 42 and the portion of the shaft 34 adjacent thereto and since the laterally inner end of the air seal casing 100 is open, access is had thereto for cleaning the interior thereof, which is an important features of the invention.

Having disclosed an exemplary embodiment of the invention, it will be apparent to those skilled in the art that various changes, modifications and substitutions may be incorporated therein without departing from the spirit or scope of the invention.

I claim:

1. In a sealing structure for a horizontal mixer having a mixing bowl, a rotatable shaft extending through an oversize opening in an end wall thereof, and an agitator having a hub in said bowl secured on said shaft adjacent the said oversize opening, said structure comprising a cylindrical air seal casing in surrounding spaced relation with respect to said shaft outside said bowl, said cylindrical air seal casing having an axially outer end closure and being open at its axially inner end, the end face of said hub forming an inner end wall for said open end of said air seal casing, the inner end of the wall of said cylindrical casing defining the open end of said casing being in sealing engagement with the marginal edge of said bowl end wall defining the oversize opening therein and having a running clearance with the outer peripheral edge of said hub forming an annular restricted air sealing clearance in circumferential radially spaced relation with respect to said shaft between the interior of said bowl and the interior of said air seal casing, and means for supplying air under pressure to the interior of said air seal casing.

2. In a sealing structure for a horizontal mixer having a mixing bowl, a rotatable shaft extending through an oversize opening in an end wall thereof, and an agitator having a hub in said bowl secured on said shaft adjacent the said oversize opening, said structure comprising a cylindrical air seal casing in surrounding spaced relation with respect to said shaft outside said bowl, said cylindrical air seal casing having an axially outer end closure and being open at its axially inner end, the end face of said hub forming an inner end wall for said open end of said air seal casing, the inner end of the wall of said cylindrical casing defining the open end of said casing being in sealing engagement with the marginal edge of said bowl end wall defining the oversize opening therein and having a running clearance with the outer peripheral edge of said hub forming an annular restricted air sealing clearance in circumferential radially spaced relation with respect to said shaft between the interior of said bowl and the interior of said air seal casing, said hub including an inner portion of major axial extent and an outer portion of minor axial extent removably secured to the outer end face of said major hub portion for reception between said hub portions of shim means of selected thickness for selectively varying the extent of said air sealing clearance, and means for supplying air under pressure to the interior of said air seal casing.

3. In a sealing structure for a horizontal mixer having a mixing bowl, a rotatable shaft extending through an oversize opening in an end wall thereof, and an agitator having a hub in said bowl secured on said shaft adjacent the said oversize opening, said structure comprising a cylindrical air seal casing in surrounding spaced relation with respect to said shaft outside said bowl, said cylindrical air seal casing having an axially outer end closure and being open at its axially inner end, the end face of said hub forming an inner end wall for said open end of said air seal casing, the inner end of the wall of said cylindrical casing defining the open end of said casing being in sealing engagement with the marginal edge of said bowl end wall defining the oversize opening therein and having a running clearance with the outer peripheral edge of said hub forming an annular restricted air sealing clearance in circumferential radially spaced relation with respect to said shaft between the interior of said bowl and the interior of said air seal casing, releasable means for detachably securing said air seal casing in sealing engagement with said bowl end wall, said air seal casing being movable along said shaft upon release of said releasable means from sealing engagement with said bowl end wall to a position providing access to said hub outer end face through said oversize opening in said bowl end wall and to the interior of said air seal casing through its open inner end, and means for supplying air under pressure to the interior of said air seal casing.

References Cited by the Examiner

UNITED STATES PATENTS

| | | | |
|---|---|---|---|
| 2,340,022 | 1/1944 | Shellenberger | 277—72 |
| 2,580,529 | 1/1952 | Dietz | 259—109 |
| 2,851,256 | 9/1958 | Andreopoulos et al. | 259—9 |
| 2,963,308 | 12/1960 | Valentyne et al. | |
| 3,039,779 | 6/1962 | Laird | 277—30 |
| 3,097,854 | 7/1963 | Kaiser | 277—72 |

LAVERNE D. GEIGER, *Primary Examiner.*

SAMUEL ROTHBERG, *Examiner.*

D. MASSENBERG, *Assistant Examiner.*